(12) United States Patent
Nastati

(10) Patent No.: US 10,882,087 B2
(45) Date of Patent: Jan. 5, 2021

(54) METHOD FOR STIMULATION AND ENHANCEMENT OF PROCESSES OF REDUCTION, TRANSFORMATION AND METABOLIZATION OF POLLUTING SUBSTANCES PRESENT IN SOILS AND/OR WATERS, BY TREATMENT WITH MIXTURE OF ENHANCED MINERAL POWDERS

(71) Applicant: Eureka Ricerca e Soluzioni Globali Società Cooperativa, Codroipo (IT)

(72) Inventor: Enzo Nastati, Codroipo (IT)

(73) Assignee: Eureka Ricerca e Solozioni Globali Società Cooperativa, Codroipo (IT)

( * ) Notice: Subject to any disclaimer, the term of this patent is extended or adjusted under 35 U.S.C. 154(b) by 0 days.

(21) Appl. No.: 16/340,120

(22) PCT Filed: Oct. 6, 2017

(86) PCT No.: PCT/IB2017/056178
§ 371 (c)(1),
(2) Date: Apr. 7, 2019

(87) PCT Pub. No.: WO2018/065949
PCT Pub. Date: Apr. 12, 2018

(65) Prior Publication Data
US 2020/0009624 A1 Jan. 9, 2020

(30) Foreign Application Priority Data
Oct. 7, 2016 (IT) .......................... 102016000100827

(51) Int. Cl.
*B09C 1/08* (2006.01)
*B09C 1/00* (2006.01)
(Continued)

(52) U.S. Cl.
CPC ............... *B09C 1/08* (2013.01); *B09C 1/002* (2013.01); *C02F 1/68* (2013.01); *B09C 2101/00* (2013.01);
(Continued)

(58) Field of Classification Search
CPC ....... B09C 1/08; B09C 1/002; B09C 2101/00; B09C 1/10; C02F 1/68; C02F 2103/06; C02F 2103/001; C02F 2305/06
(Continued)

(56) References Cited

U.S. PATENT DOCUMENTS 7,875,096 B2 * 1/2011 Van Rooijen ............. C05F 3/00
71/11

FOREIGN PATENT DOCUMENTS

| CN | 104186155 | 12/2014 |
| CN | 105061044 | 11/2015 |

(Continued)

OTHER PUBLICATIONS

International Search Report and the Written Opinion dated Nov. 21, 2017 From the International Searching Authority Re. Application No. PCT/IB2017/056178. (10 Pages).
(Continued)

*Primary Examiner* — Fred Prince

(57) ABSTRACT

A method is described for preparing a product adapted for stimulation and enhancement of processes of reduction, transformation and metabolization of polluting substances that are present in soils and/or waters, the method comprising the following steps:
a first step comprising:
  preparing a totally natural mineral substance based on Magnesium Potassium Sulphate,
  "activating" said mineral substance by mixing it for a time of 3' 23", with a tolerance of plus-minus 10 seconds;
a second step comprising:
  making an organic-base product obtained by burying bovine manure inserted in cow horns into weakly calcareous soil (pH 7.5-8.0) for a period lasting from the autumn to the following spring;
  thereafter, dynamizing said organic-base product by mixing a part thereof into 99 parts of distilled water, thereby obtaining a liquid substance;
  said dynamization comprising a first active phase of succussions for 60 seconds, followed by a pause of 80 seconds, in turn followed by a second active phase of succussions for additional 60 seconds,
  said liquid substance is then diluted again with distilled water in a proportion of 1 to 99 and then further dynamized with said succussions followed by pauses, repeated 5 more times;
a third step comprising:
  combining the product obtained in the first step with the product obtained in the second step, in a proportion of 1 ml of product of the second step for 1 kg of product of the first step;

(Continued)

"activating" said combination by mixing it for a period of 5' 25" (with a tolerance of plus-minus 10 seconds), thereby obtaining said product adapted for stimulation and enhancement.

10 Claims, 1 Drawing Sheet

(51) Int. Cl.
  *C02F 1/68* (2006.01)
  *C02F 103/00* (2006.01)
  *C02F 103/06* (2006.01)
(52) U.S. Cl.
  CPC .... *C02F 2103/001* (2013.01); *C02F 2103/06* (2013.01)
(58) Field of Classification Search
  USPC ............ 210/747.8; 405/128.5, 128.75; 71/21
  See application file for complete search history.

(56) References Cited

FOREIGN PATENT DOCUMENTS

| | | |
|---|---|---|
| RU | 2015101195 | 8/2016 |
| WO | WO 2018/065949 | 4/2018 |

OTHER PUBLICATIONS

Artiola et al. "Use of Langbeinite to Reclaim Sodiac and Saline Sadie Soils", Communications in Soil Science and Plant Analysis, XP055383391, 31(17-18):2829-2842, Oct. 1, 2000.

Demeter "Das Herzstück der Biodynamischen Landwirtschaft: Biodynamische Präparate", Demeter e.V., XP055383863, Newsletter, 6 P., Jun. 21, 2017.

\* cited by examiner

US 10,882,087 B2

METHOD FOR STIMULATION AND ENHANCEMENT OF PROCESSES OF REDUCTION, TRANSFORMATION AND METABOLIZATION OF POLLUTING SUBSTANCES PRESENT IN SOILS AND/OR WATERS, BY TREATMENT WITH MIXTURE OF ENHANCED MINERAL POWDERS

This application is a National Phase of PCT Patent Application No. PCT/IB2017/056178 having International filing date of Oct. 6, 2017, which claims the benefit of priority of Italian Patent Application No. 102016000100827 filed on Oct. 7, 2016. The contents of the above applications are all incorporated by reference as if fully set forth herein in their entirety.

FIELD AND BACKGROUND OF THE INVENTION

The present invention relates to a method for stimulation and enhancement of processes of reduction, transformation and metabolization of polluting substances that are present in soils and/or waters through treatment with a mixture of enhanced mineral powders.

It is generally recognized that natural processes of self-purification and self-detoxication occur in a healthy and vital organism. This is true for every living being, whether human or animal or vegetable, in agricultural soil and in water: when the latter is subject to run-off and oxygenation processes, self-purification phenomena arise.

It is believed that this state of natural vitality is a consequence of a process of activation of metabolic functions induced in the soil by humidified organic substances and induced in the water by oxygenation, thus promoting the elimination of foreign and noxious matters and ingredients, such as the above-mentioned pollutants.

In order to address the problem of the presence of pollutants in the soil, soil "washing" systems have been developed and are currently in use for washing away and removing the polluting contents, but these systems cannot solve the root of the problem, since they can only temporarily reduce the phenomenon for a short period of time without inducing any long-lasting action, so that, if exposition to the polluting source continues, the washing process will have to be repeated over time. It must also be underlined that such a process only "moves" the problem from one site to another.

Also the known process called chelation does not solve the problem of the presence of undesired substances, since it solely blocks the pollutant's capability of interaction with other elements; paradoxically, this process keeps the pollutant unaltered over time.

SUMMARY OF THE INVENTION

It is therefore one object of the present invention to propose a method for stimulation and enhancement of processes of reduction, transformation and metabolization of polluting substances that are present in soils and/or waters through treatment with a mixture of enhanced mineral powders, which method is aimed at overcoming the above-mentioned drawbacks.

The present invention relates to a specific treatment, divided into several steps and directed towards enhancing self-demolition properties useful for the reduction, transformation and metabolization of polluting substances of mineral, chemical and organic origin that may be found in soils and/or waters.

The main ingredient, which is the container of the properties that are essential for said enhancement, is a mixture of mineral powders based on Magnesium Potassium Sulphate, which is subjected to a particular treatment and enhancement and is then appropriately diluted for being introduced into said soils and waters in order to promote an enhancement of their natural self-regeneration properties. All this is aimed at restoring a natural organic balance, wherein the presence of pollutants is no longer so significant as to inhibit the use of said soils and water for agricultural or other allowed purposes.

The method of the invention allows activating a process of autogenous molecular disaggregation of the pollutants, so as to reduce the measurable amount thereof to a level below a harmful threshold where the productivity of the soils and their cultures, or any other allowed use thereof, is impaired or jeopardized. The method uses wholly natural ingredients, processes and components, so that it can:
- stimulate the natural microbiologic balance, and hence also the autogenous capability of restoring the natural and functional balances of soils and waters;
- prevent any undesired reaction or effect of the proposed solution.

This stimulation and enhancement method is the result of in-depth research that resulted in the detection of the high capability of said treated mineral rock mixture of stimulating, supporting and reinforcing the biological processes of a complex organism such as soil and water that lead to disaggregation and/or metabolization of pollutants of different origin and species.

This results in an important action for supporting and reinforcing the natural self-defense capabilities of soil and water, which, when stimulated by the introduction of said mineral mixture, can thus develop a significantly enhanced pollutant abatement process, whereas without the aid of such a product the soil and water affected by high pollutant contents would not be able to reduce and/or eliminate the noxious effects of the pollutants upon the cultures.

It is one object of the present invention to provide a method for preparing a product adapted for stimulation and enhancement of processes of reduction, transformation and metabolization of polluting substances that are present in soils and/or waters, as set out in claim 1.

It is another object of the present invention to provide a method for preparing a product adapted for stimulation and enhancement of processes of reduction, transformation and metabolization of polluting substances that are present in soils and/or waters, as set out in claim 8.

It is a further object of the present invention to provide a product obtained by means of a method as set out in claim 1 or 8.

It is yet another object of the present invention to provide a soil treatment that uses a product obtained by means of a method as set out in claim 1 or 8.

It is a particular object of the present invention to provide a method for stimulation and enhancement of processes of reduction, transformation and metabolization of polluting substances that are present in soils and/or waters through treatment with a mixture of enhanced mineral powders as set out in the claims, which are an integral part of the present description.

BRIEF DESCRIPTION OF THE SEVERAL VIEWS OF THE DRAWINGS

Further objects and advantages of the present invention will become apparent from the following detailed description of some embodiments thereof, supplied merely by way of non-limiting example with reference to FIG. 1, which illustrates an embodiment of a "carboy-shaped" vessel, and from the following description of the oscillating dynamization process.

DESCRIPTION OF SPECIFIC EMBODIMENTS OF THE INVENTION

Figure 1:
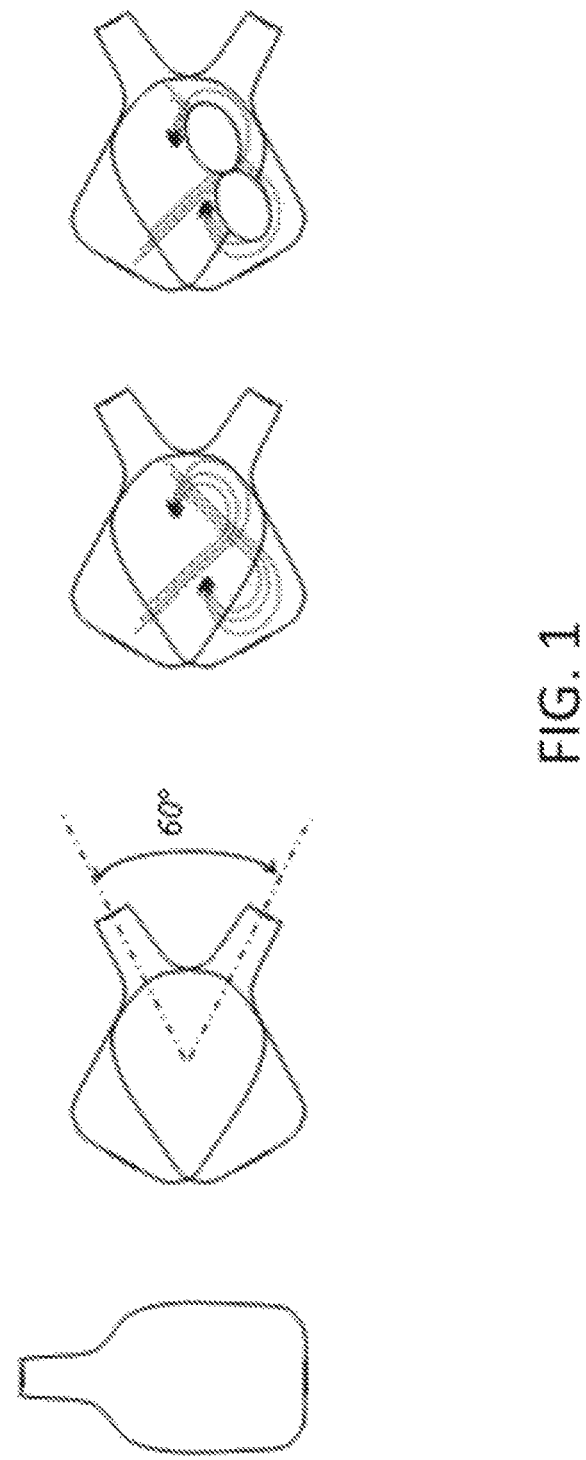

It is one object of the invention to provide a method for preparing a product for treating soils (such as loam, earth or the like) and/or waters (spring water, flowing water or rain water) via introduction of a mixture of minerals based on Magnesium Potassium Sulphate, suitably enriched by treatment and enhancement through a composted organic substance, and comprises various preparation and activity steps as described below.

A first step comprises preparing a totally natural mineral substance to be subsequently treated in a specific manner to improve its biological and functional stimulation properties and powers.

This natural mineral substance based on Magnesium Potassium Sulphate preferably has the following composition:

| | |
|---|---|
| Potassium Sulphate (K2SO4) | 50.5% |
| Magnesium Sulphate (MgSO4) | 30.5% |
| Other Sulphates (CaSO4, etc.) | 1.5% |
| Chlorides (KCl, NaCl) | 5.5% |
| Water of crystallization (H2O) | 12% |
| Cl | <=3% |

Said mineral substance is "activated" by mechanical mixing for a time of 3' 23" (with a tolerance of plus-minus 10 seconds), carried out with an industrial powder mixer; The mixer may consist of a normal concrete mixer, e.g. having a capacity of 250 liters, turning at a speed of 15 to 25 revolutions per minute.

A second step of the method provides for making an organic-base product that will then be appropriately combined with said mixture of minerals based on Magnesium Potassium Sulphate.

This organic-base product is obtained by burying bovine manure inserted in cow horns, preferably to a depth of 100-120 cm, into weakly calcareous soil (pH 7.5-8.0), in the autumn season, in accordance with the technique developed in biodynamic agriculture for making the preparation known as "horn manure". In spring, the product will be sufficiently mature and ready for use. The total burying period is approx. 4-6 months.

At the end of the maturing process, one part of this mass is dynamized into 99 parts of distilled water, preferably by using a per se known carboy-shaped vessel (see FIG. 1).

With reference to FIG. 1, said dynamization occurs according to the following process.

A first dynamization is carried out for 60 seconds, followed by a pause of 80 seconds, in turn followed by a second enhancement dynamization for additional 60 seconds.

During the 60-second "active phases", the product is subjected to specific "succussions" (rhythmic shaking) at a rhythm of 72 succussions per minute, with an oscillation of 60°.

A succussion is an action that imparts a strong agitation in the liquid mass contained in the vessel, thus determining conditions in which infinite vortices are formed in the mass due to the 60° oscillating motion applied to the mass, which motion causes the formation of "harmonic figures of eight".

At the end of this dynamization step, the resulting liquid substance is diluted again with distilled water in a proportion of 1 to 99, and then further enhanced by repeating the same rhythm, time and modes as used in the first succussion.

This procedure is then repeated 5 more times with the same proportions and rhythms, for a total succussion and enhancement process consisting of 7 times/steps.

For this step to give the best results, the vessel in which all succussion operations are carried out should preferably have a "carboy" shape as previously described, so that the succussion will cause the formation of a "lemniscate" (also referred to as "harmonic figure of eight") motion within the mass. The vessel should be positioned horizontally and undergo a constant oscillation by 60 degrees.

A third step of the method provides for combining the product of the first step with the product of the second step.

The above-described liquid product obtained in the second step (distilled water with minimal traces of organic substance of bovine manure) is inserted into the mixture of mineral powders based on Magnesium Potassium Sulphate in the following proportions: 1 ml of enhanced liquid substance for 1 kg of Magnesium Potassium Sulphate. The latter will have already been activated by mechanical mixing as explained with reference to the first step.

This is followed by mixing, by means of a mechanical mixer, the Magnesium Potassium Sulphate powder, combined with the enhanced liquid substance of the second step, for 5' 25" (with a tolerance of plus-minus 10 seconds) for the purpose of optimizing the union and activation thereof.

When mixing is complete, the product is ready for use and can be appropriately packaged. This product can be defined as a generic depolluting agent.

According to a method of use of said product, it is diluted into water in the proportion of 1 kg in 200-250 liters of drinking water and then scattered or introduced into the soil, preferably in fine drops, in a dose of 1-10 kg per hectare, depending on the severity of the pollution, which may be caused by organic substances, heavy metals, hydrocarbons, chlorine compounds, or the like. In the case of watersheds, the dose will be 1-10 kg of product per 10-50 m$^3$ of water, depending on the type and severity of the pollution. This will allow the soil or water self-depollution process to be activated in an organic and wholly natural manner.

After the application of the product defined as a generic depolluting agent, the polluting contents will decrease till 50% within two months and till 80% within three months. In the case of eco-compatible agriculture, the effect can be considered to remain stable over time. In the case of conventional agriculture, i.e. an agricultural practice that makes use of synthesized chemical substances, the effect may only last one year.

Wherever the soil or water is exposed to a specific pollution, whether chemical, organic, etc., that requires specific, more incisive depolluting actions, the method may include, in the preparation of the final composition of the product, the following additional steps.

Some non-limiting examples of specific polluting substances are:

Inorganic compounds, such as Arsenic, Beryllium, Cadmium, Cobalt, total Chromium, Chromium VI, Mercury;

Plant protection products, such as Alachlor, Aldrin, Atrazine, Dioxins and Furans, PCDD summation, PCDF (T.E. conversion), PCB;

Parasiticides, such as DDD, DDT, DDE, Dieldrin, Endrin;
Others, e.g. Asbestos (A fibers>10 mm).

The product prepared in the above-described three steps is then complemented with a further specific product derived from the specific polluting substance, obtained in accordance with the procedure described below.

In a fourth step, a specific product is obtained by dynamizing 1 part of the polluting substance to be treated into 99 parts of distilled water.

Said dynamization shall occur in accordance with the process already described for the product obtained in the second step, starting from a time period of 60 seconds, followed by a pause of 80 seconds and by a second enhancement period of additional 60 seconds.

During the 60-second "active phases", the product is subjected to specific "succussions" (rhythmic shaking) at a rhythm of 72 succussions per minute, according to the above-described procedure.

At the end of this dynamization step, the resulting liquid substance is diluted again with distilled water in a proportion of 1 to 99, and then further enhanced by repeating the same rhythm, time and modes as used in the first succussion.

This procedure is then repeated 5 more times with the same proportions and rhythms, for a total succussion and enhancement process consisting of 7 times/steps.

For this step to give the best results, as already described with reference to the second step, the vessel in which all succussion operations are carried out should preferably have a "carboy" shape, so that the succussion will cause the formation of a "lemniscate" (also referred to as "harmonic figure of eight") motion within the mass. The vessel should be positioned horizontally and undergo a constant oscillation by 60 degrees.

In a fifth step of the method, the product of the fourth step is combined with the product obtained in the third step in a proportion of 1 part of product of the fourth step and 2 parts of product of the third step.

In a sixth step, the product of the fifth step is introduced into the above-described mineral mixture based on Magnesium Potassium Sulphate.

The above-described liquid product obtained in the fifth step is inserted into the mixture of mineral powders based on Magnesium Potassium Sulphate in the following proportions: 1-10 ml of enhanced liquid substance for 1 kg of product based on Magnesium Potassium Sulphate, depending on the severity of the pollution. The Magnesium Potassium Sulphate will have already been activated by mechanical mixing as explained above with reference to the generic depolluting agent.

This is then followed by mechanical mixing of the Magnesium Potassium Sulphate powder combined with the enhanced liquid substance obtained in the fifth step for 4' 08" (with a tolerance of plus-minus 10 seconds) by means of an industrial powder mixer in accordance with above-described procedure for the purpose of optimizing the union and activation thereof.

When mixing is complete, the product is ready for use and can be appropriately packaged. This product can be defined as a specific depolluting agent.

The product must be used as follows: it is diluted into water in the proportion of kg in 200-250 liters of drinking water and then scattered or introduced into the soil, preferably in fine drops, in a dose of 1-10 kg per hectare, depending on the type and severity of the pollution. In the case of watersheds, the dose will be 1-10 kg of product per 10-50 m³ of water, depending on the type and severity of the pollution. This will allow the soil or water self-depollution process to be activated in an organic and wholly natural manner.

After the application of the product defined as a specific depolluting agent, the polluting contents will decrease by 50% within two months and by 80% within three months.

In the case of eco-compatible agriculture, the effect can be considered to remain stable over time. In the case of conventional agriculture, i.e. an agricultural practice that makes use of synthesized chemical substances, the effect may only last one year The above-described non-limiting example of embodiment may be subject to variations without departing from the protection scope of the present invention, including all equivalent implementations known to a man skilled in the art.

The elements and features shown in the various preferred embodiments may be combined together without however departing from the protection scope of the present invention From the above description, those skilled in the art will be able to produce the object of the invention without introducing any further construction details.

The invention claimed is:

1. Method for preparing a product adapted for stimulation and enhancement of processes of reduction, transformation and metabolization of polluting substances that are present in soils and/or waters, the method comprising the following steps:
   a first step comprising:
      preparing a totally natural mineral substance based on Magnesium Potassium Sulphate,
      "activating" said mineral substance by mixing it for a time of 3 minutes and 23 seconds, with a tolerance of plus-minus 10 seconds to obtain a product:
   a second step comprising:
      making an organic-base product obtained by burying bovine manure inserted in cow horns into weakly calcareous soil at pH 7.5-8.0 for a period lasting from the autumn to the following spring;
      thereafter, dynamizing said organic-base product by mixing a part thereof into 99 parts of distilled water, thereby obtaining a liquid substance;
      said dynamization comprising a first active phase of succussions for 60 seconds, followed by a pause of 80 seconds, in turn followed by a second active phase of succussions for additional 60 seconds,
      said liquid substance is then diluted again with distilled water in a proportion of 1 to 99 and then further dynamized with said succussions followed by pauses, repeated 5 more times;
   a third step comprising:
      combining the product obtained in the first step with the product obtained in the second step, in a proportion of 1 ml of product of the second step for 1 kg of product of the first step;
      "activating" said combination by mixing it for a period of 5 minutes and 25 seconds with a tolerance of plus-minus 10 seconds, thereby obtaining said product adapted for stimulation and enhancement.

2. Method according to claim 1, wherein said totally natural mineral substance based on Magnesium Potassium Sulphate comprises:

| | |
|---|---|
| Potassium Sulphate (K2SO4) | 50.5% |
| Magnesium Sulphate (MgSO4) | 30.5% |

| | |
|---|---|
| Other Sulphates (CaSO4, etc.) | 1.5% |
| Chlorides (KCl, NaCl) | 5.5% |
| Water of crystallization (H2O) | 12% |
| Cl | <=3% |

3. Method according to claim 1, wherein said bovine manure inserted in cow horns is buried to a depth of 100-120 cm, and said period from the autumn to the following spring lasts 4-6 months.

4. Method according to claim 1, wherein said succussion comprises agitation in a carboy-shaped vessel, with a "lemniscate" or "harmonic figure of eight" motion oscillating by 60°.

5. Method according to claim 1, wherein said mixing is performed by a concrete mixer having a capacity of 250 litres and turning at a speed of 15 to 25 revolutions per minute.

6. Product adapted for stimulation and enhancement of processes of reduction, transformation and metabolization of polluting substances that are present in soils and/or waters, characterized in that said product is obtained through a method according to claim 1, and in that said product comprises said "activated" totally natural mineral substance based on Magnesium Potassium Sulphate, and said organic-base product obtained by burying bovine manure inserted in cow horns into weakly calcareous soil at pH 7.5-8.0 for a period lasting from the autumn to the following spring.

7. Method adapted for stimulation and enhancement of processes of reduction, transformation and metabolization of polluting substances that are present in soils and/or waters, the method comprising the following steps:
   diluting said product adapted for stimulation and enhancement, as claimed in claim 6, into water in a proportion of 1 kg in 200-250 litres of drinking water;
   scattering said dilution into the soil in a dose of 1-10 kg per hectare, depending on the severity of the pollution; and/or
   scattering said dilution into watersheds in a dose of 1-10 kg of product per 10-50 m$^3$ of water, depending on the severity of the pollution.

8. Method for preparing a product adapted for stimulation and enhancement of processes of reduction, transformation and metabolization of polluting substances that are present in soils and/or waters, as claimed in claim 1, the method comprising the following additional steps:
   a fourth step, wherein a specific product is obtained by dynamizing 1 part of the polluting substance into 99 parts of distilled water, said dynamization occurring as in said second step;
   a fifth step, wherein the product of the fourth step is combined with the product obtained in the third step in a proportion of 1 part of product of the fourth step and 2 parts of product of the third step;
   a sixth step, wherein the product of the fifth step is inserted into said totally natural mineral substance based on Magnesium Potassium Sulphate in the following proportions: 1-10 ml of enhanced liquid substance per 1 kg of product based on Magnesium Potassium Sulphate, depending on the severity of the pollution, said totally natural mineral substance based on Magnesium Potassium Sulphate being activated as in the first step for a time of 4 minutes and 8 seconds with a tolerance of plus-minus 10 seconds, thereby obtaining a second product adapted for stimulation and enhancement of reduction processes.

9. Product adapted for stimulation and enhancement of processes of reduction, transformation and metabolization of polluting substances that are present in soils and/or waters, characterized in that it is obtained through a method as claimed in claim 8.

10. Method adapted for stimulation and enhancement of processes of reduction, transformation and metabolization of polluting substances that are present in soils and/or waters, the method comprising the following steps:
   diluting said product adapted for stimulation and enhancement, as claimed in claim 9, into water in a proportion of 1 kg in 200-250 litres of drinking water;
   scattering said dilution into the soil in a dose of 1-10 kg per hectare, depending on the severity of the pollution; and/or
   scattering said dilution into watersheds in a dose of 1-10 kg of product per 10-50 m$^3$ of water, depending on the severity of the pollution.

* * * * *